Dec. 11, 1962 J. REESEN 3,067,646
ADHESIVE STRIPE DETECTOR
Filed Nov. 24, 1958 3 Sheets-Sheet 1

Jörgen Reesen
INVENTOR.

BY R. Frank Smith
Steve W. Grembau
ATTORNEYS

United States Patent Office 3,067,646
Patented Dec. 11, 1962

3,067,646
ADHESIVE STRIPE DETECTOR
Jorgen Reesen, Rochester, N.Y., assignor to Eastman Kodak Company, Rochester, N.Y., a corporation of New Jersey
Filed Nov. 24, 1958, Ser. No. 775,897
7 Claims. (Cl. 88—14)

This invention relates generally to detecting systems, and more specifically to a device for detecting inadequate or faulty adhesive strips applied to the tacking area of transparency mounts.

When machines are used for mounting a film transparency within a film mount, it is necessary to tack the transparency in an operative position in the transparency-receiving space framed by the spacer element before the mount is folded and sealed. The tacking is necessary to assure that the entire picture-bearing area of the transparency is viewable through the apertures, and to eliminate the possibility of an undesired portion of the transparency beyond the picture area appearing in the aperture viewing area. The tacking also eliminates any possible twisting or skewing of the transparency prior to sealing which would otherwise result in improper orientation of the transparency with respect to the apertures. This tacking operation has, in certain instances, been accomplished by applying an adhesive liquid stripe adjacent and parallel to one edge of one of the apertures of the film mount. A mechanism for accomplishing this is disclosed in U.S. Patent No. 2,874,673, by H. L. Fitch. In using a mechanism of this type, instances occur where the adhesive stripe is inadequate or faulty occasioned by the applicator skipping and leaving a portion of the tacking area devoid of adhesive, or by applying an insufficient amount of adhesive to the mount. Where defectively striped mounts of this type are used in the mounting machines, the transparency is apt to slip as a result of the defective strip and the mount to be sealed with the transparency improperly oriented with respect to the apertures. This necessitates costly remounting of the transparency by hand.

It is therefore one of the primary objects of this invention to provide an adhesive stripe detector for detecting and marking the defectively striped mounts so that they may be readily removed prior to shipment of the mounts to a processing laboratory.

Another object of the invention is to provide an adhesive stripe detector that is of simple design and construction, thoroughly reliable and efficient in operation, and economical to manufacture.

Another object of the invention is to provide an adhesive stripe detector adapted to place a crimp mark along the edge of each film mount that has a defective adhesive stripe to enable the defective mount to be readily detected when the mounts are stacked in piles, and removed therefrom.

One more object of the invention is to provide a delay mechanism in the marking circuit to assure complete operation of the marking solenoid for small but significant defects in adhesive stripe application such as a short bare portion inside of the desired tacking area.

Still another object of the invention is the provision of a stabilizing circuit adapted when the web is stopped, and the light source turned off but the power still connected to the detector, to prevent the control tubes and marking solenoid from operating erratically.

Objects and advantages other than those set forth above will be apparent from the following description when read in connection with the accompanying drawings, in which.

Figures 1, 2:
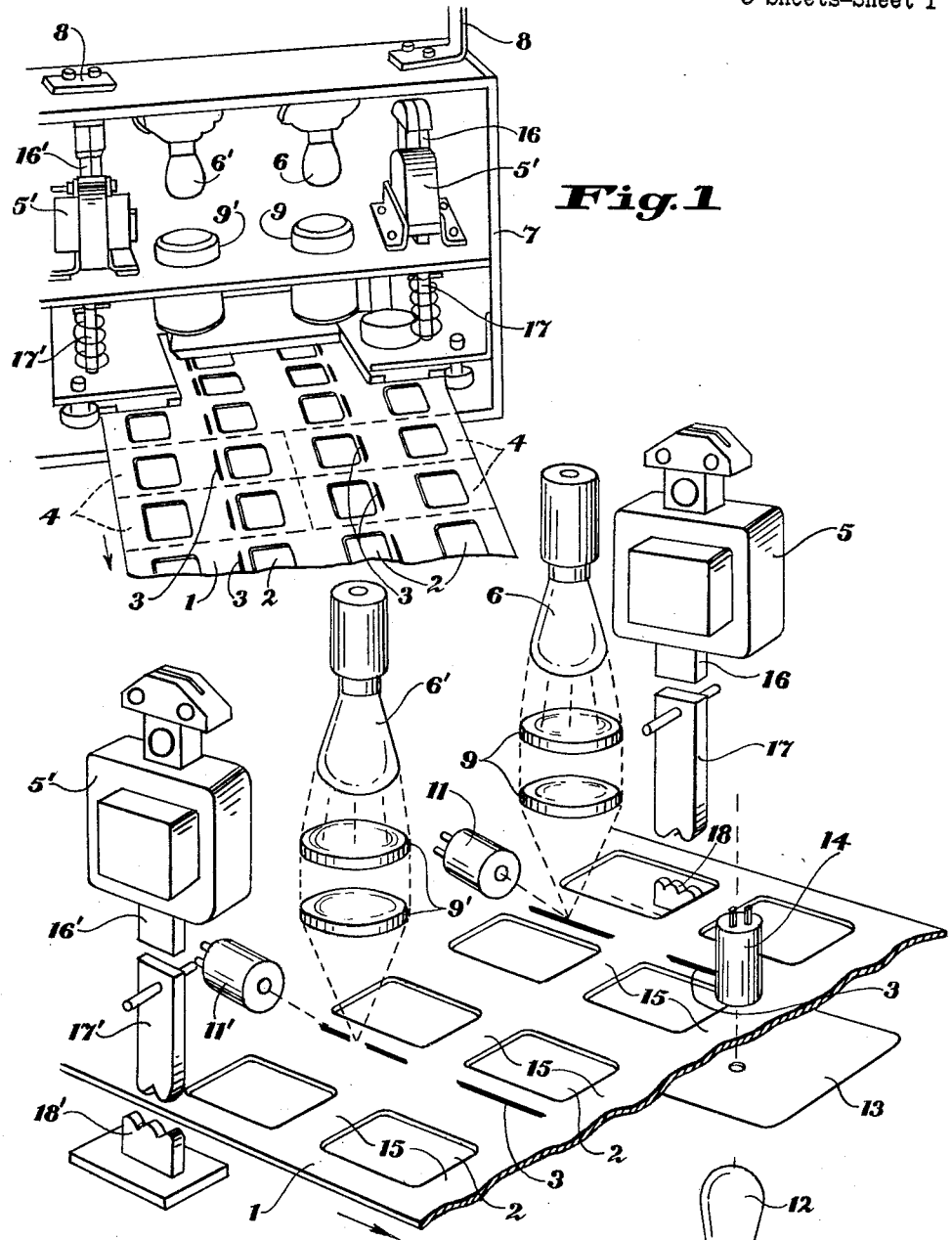
FIG. 1 is a perspective view showing the adhesive stripe detector.
FIG. 2 is an enlarged fragmentary schematic view in perspective showing the major mechanical components of the adhesive stripe applicator of FIG. 1.
Figure 3:
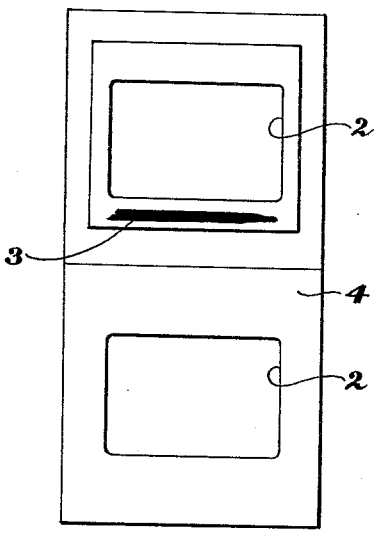
FIG. 3 is a plan view of a transparency mount having an adhesive stripe in the desired tacking area.

As shown in the drawings, the adhesive stripe detector is used in connection with a film mount web 1 after the apertures 2 have been punched out and adhesive stripes 3 have been placed thereon. The adhesive prior to application has been compounded with a light-absorbing dye. The film mount web 1 passes through the adhesive stripe detector prior to the chopping operation in which each transverse row of apertures 2 of the web 1 is adapted to yield two film mounts 4 as shown dotted in FIG. 1. Since the film mount web 1 as shown is adapted to yield two adjacently disposed film mounts 4, it is necessary to provide identical light sources, marking solenoids and associated components for each of the film mounts. Accordingly, the adhesive stripe detector as shown is provided with identical detecting units comprising a pair of marking solenoids 5, 5', one for the edge of each of the mounts 4, a pair of light sources 6, 6' each adapted to illuminate the web 1 along a path including the adhesive stripes 3 and ancillary identical equipment used in conjunction with each light source and associated marking solenoid.

In describing the adhesive stripe detector, only one detecting unit will be described in detail and the identical parts of the other detecting unit will be indicated by the same numerals primed. The mechanical operating parts of the adhesive stripe detector are carried by a frame member 7 which is in turn secured to a suitable support, not shown, by brackets 8. The light source or lamp 6 cooperates with a lens unit 9 for directing a small focused spot of intense illumination along a path on the web 1 including the adhesive stripes 3. A photocell 11, such as a cadmium sulfide cell, receives the light reflected off of the film mount web 1. Another light source 12 is disposed underneath the web 1 and cooperates with a mask 13 to produce a narrow beam of light adapted to pass through the punched-out apertures 2 in the film mount web 1 and impinge upon a photocell 14 similar to photocell 11. As the film mount web 1 is moved in the direction of the arrows seen in FIGS. 1 and 2 by some suitable transport device, not shown, the ribs 15, or portion of the web 1 remaining between succeeding apertures 2, blocks the light from the light source 12 so that the photocell 14 does not receive any light during this period. The light sources 6 and 12 are physically spaced apart along the longitudinal axis of the web a predetermined distance such that the light from the light source 12 will be blocked from the photocell 14 by the web rib 15 during the time that the light spot from light source 6 scans the central portion of the applied adhesive stripe 3 for a purpose to be explained hereinafter. The marking solenoid 5 is mounted on the frame in line with the focused light spot for lamp 6. The solenoid armature 16 will, when actuated, strike a spring biased marking punch 17 which will impart a permanent crimp 19 as seen in FIG.

4 to the edge of the web 1 as the punch momentarily bottoms against a marking anvil 18.

Figure 5:
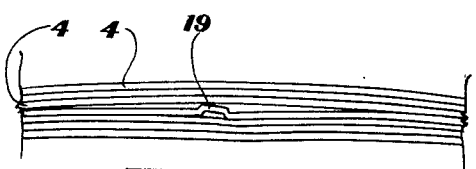
FIG. 5 is a segmental end view, greatly enlarged, of a plurality of transparency mounts stacked in a pile and showing how the crimped end of a film mount having a defective stripe is readily visible and easily detected.

After the individual film mounts 4 have been chopped or severed from the film mount web 1, the film mounts 4 are stacked in piles prior to shipment to a processing laboratory. The crimped edge of a defective mount 4 in a pile of film mounts prevents the edges of film mounts adjacent thereto from making contact along the entire edge. Instead, the crimp causes the film mounts 4 to be spaced apart which is readily detectable. Accordingly, it is a simple matter for the operator to inspect the piles and detect the defective film mounts 4 which are readily visible as seen in FIG. 5.

Figure 7:
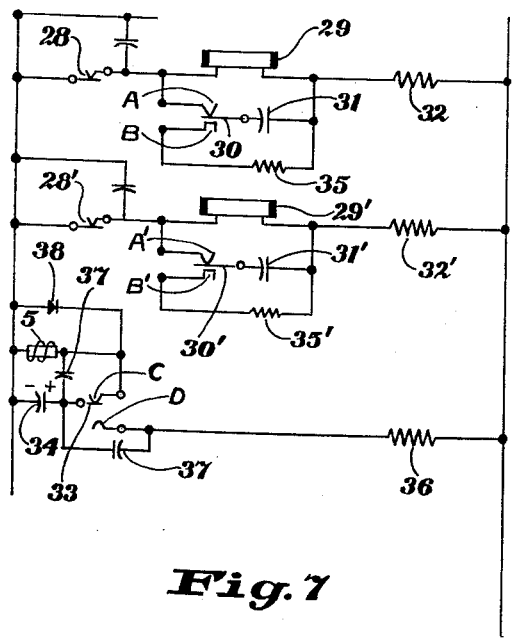
FIG. 7 is an enlarged view of a portion of the circuit diagram of FIG. 6.
Figure 6:
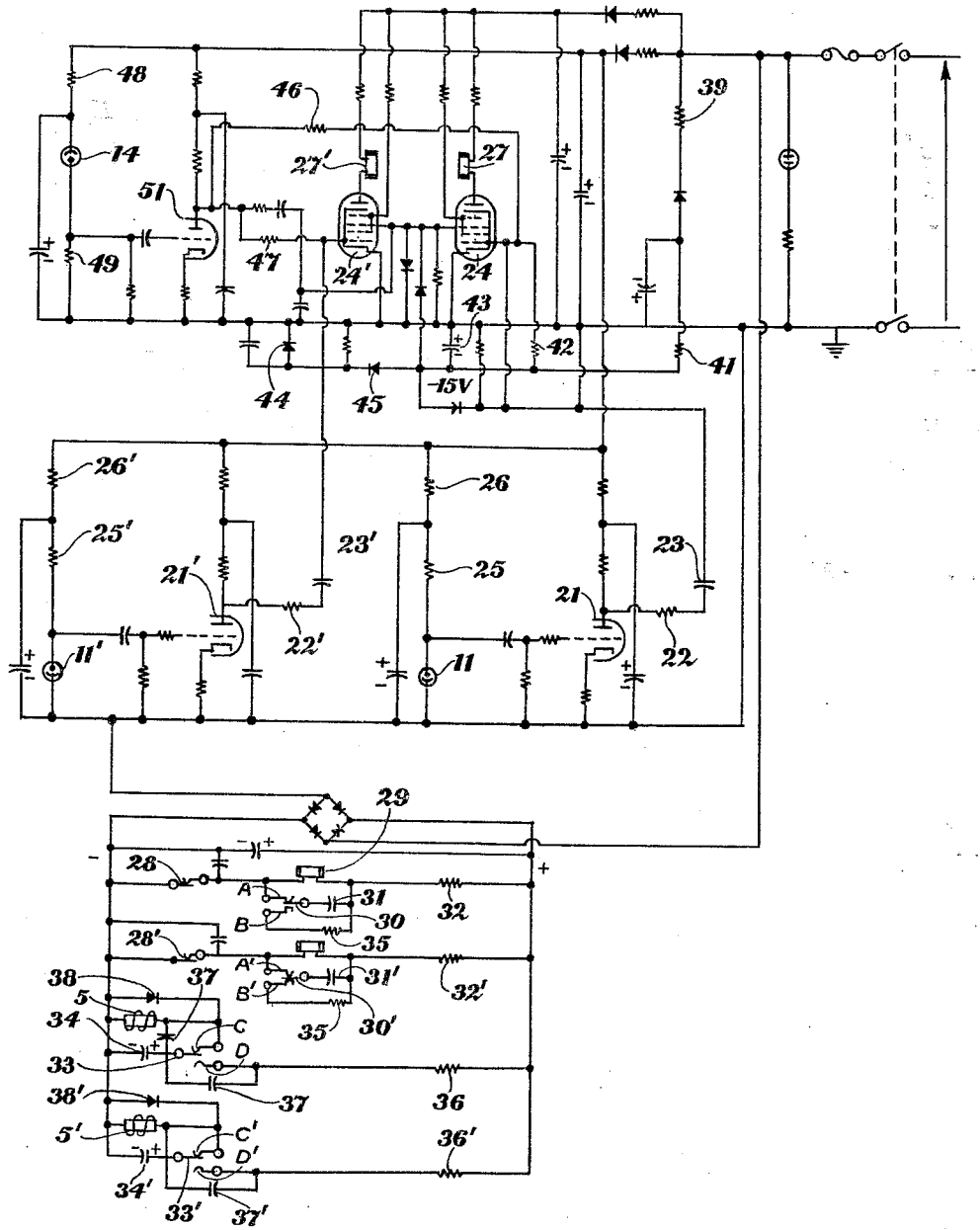
FIG. 6 is a schematic electric circuit diagram for the adhesive stripe detector of this invention.

The electric circuit diagram showing the electrical components adapted to be used in conjunction with the aforementioned mechanical elements is shown in FIG. 6. One end of the photocell 11 is connected to the grid of a triode 21 and the output thereof supplied through a resistor 22 and condenser 23 to the electrically connected control and suppressor grids of a heptode 24. The tube 24 is of a well-known type in which the control grid 24 is the grid nearest the cathode and is electrically connected to the suppressor grid which is the grid nearest the anode. The grids nearest the suppressor and control grids are screen grids and are electrically connected together. Tube 24 further has an intermediate grid interposed between the screen grids. The photocell 11 is in series with resistors 25, 26 and effectively forms a voltage divider network in which the resistance of the photocell 11 is inversely proportional to the quantity of light from the light source 6 impinging upon it. In other words, as the light impinging upon the photocell 11 increases such as occurs when the light beam passes over a defective portion of a stripe 3 which reflects more light onto the photocell 11, the voltage across the photocell 11 decreases. The voltage across the photocell 11 is coupled to the grid of the triode 21 and as the voltage decreases, the triode 21 conducts a lesser amount. The plate voltage of the triode 21 increases as it conducts less and this increased potential is fed to the control and suppressor grids of the heptode 24 causing it to conduct. A relay 27 in the plate circuit of the heptode 24 operates when the tube conducts to open a contact 28 that is normally closed as best seen in FIG. 7. As soon as the contact 28 is opened, a relay 29 stops operating causing a contact 30 which is in a position B to move to position A placing a condenser 31 in series with a resistor 32. The condenser 31 cannot charge up, however, since the contact 28 is open. Also, another contact 33 controlled by the relay 29 which is in position D moves to position C placing a charged condenser 34 in series with the marking solenoid 5 whereupon the condenser 34 transfers its charge to the solenoid 5 momentarily actuating the solenoid causing the solenoid armature 16 to strike the marking punch 17 to impart a crimp 19 to the edge of the web 1 as the punch bottoms on the anvil 18.

Figure 4:
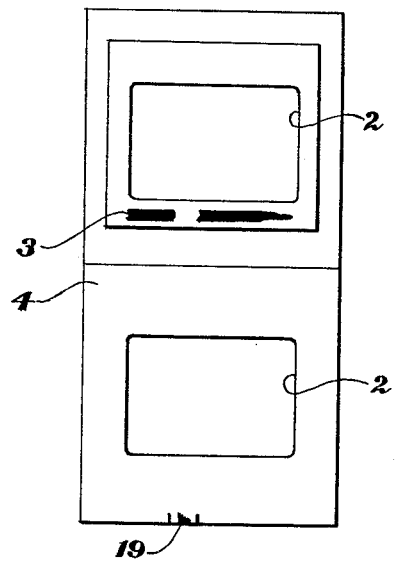
FIG. 4 is a view similar to FIG. 3 showing a film transparency mount having a defective adhesive stripe and a crimp mark along one edge of the mount in alignment with the defect.

Once the light beam has passed over the defective portion of the stripe 3, the good portion of the stripe absorbs a sufficient amount of light so that the voltage across the photocell 11 and hence the grid voltage of the triode 21 increases causing the triode to conduct a greater amount. The plate voltage of the triode 21 decreases and this decreased voltage is fed to the heptode 24 causing it to stop conducting. The relay 27 stops operating and the contact 28 returns to its closed position placing the condenser 31 and resistor 32 across line voltage whereupon the condenser 31 begins to charge. This constitutes a delay for the relay 29 which will not begin to operate until the condenser 31 is charged up to a predetermined value. This delay is necessary to allow the contact 33 to remain in position C long enough so that the condenser 34 in discharging will actuate the solenoid 5 to place a mark on the web 1. Without this delay, short but significant defects in the adhesive stripe 3, such as a short bare portion inside of the desired tacking and as seen in FIG. 4 would pass under the light beam too rapidly to permit actuation of the solenoid 5. As soon as the relay 29 operates, the contact 30 is moved back into the position B placing the condenser 31 in series with a resistor 35 whereupon the condenser 31 discharges. Also, the contact 33 is moved back into position D placing the condenser 34 in a resistor 36 across line voltage whereupon the condenser 34 is charged.

Condensers 37 are provided to function as spark suppressors for protecting the contact 33. A half-wave rectifier 38 is also placed across the solenoid 5 for counteracting induced voltage developed when the solenoid operates. The heptode 24 is provided with voltage divider resistor network 39, 41, 42 and a condenser 43 which effectively holds the potential at one end of the condenser at a —15 volts. The other end of the condenser is at substantially ground potential or is in effect grounded to the chassis. A pair of diods 44, 45 are provided for effectively clipping and clamping the voltage which is applied to the control grid of the heptode 24 to a value between 0 and —15 volts.

The circuit comprising triode 51 for amplifying the signal or voltage across photocell 14 has an extremely high low-frequency response extending down to ½ cycle per second. This unusual low-frequency response is necessary to make the circuit function at the slow photocell signal rate due to the slow operating speed of the film mount web 1 which is advanced at about two mounts per second. The short term direct current drift in the circuit due to drift in tube operating points, component variations, etc. is amplified also, and this drift component may be amplified sufficiently to cause the control and suppressor grids of heptode 24' to vary erratically between 0 and —15 volts causing the heptode 24' to conduct in a random fashion when the adhesive stripe detector is in an inoperative or shut down position with web 1, stopped, the light source turned off but the detector connected to the power supply. This is disadvantageous, resulting in erratic operation of the solenoid 5' causing the punch 17' to bottom on anvil 18' chewing up the edge of the web therebetween. To eliminate this problem, resistors 46, 47 have been provided interconnecting the control and suppressor grids of the tubes 24, 24'. One end of the resistors is connected to the anode of triode 51 which provides a low positive voltage. As a result, the control grid voltage of the heptodes 24, 24' due to drift will be maintained at essentially zero potential causing the heptodes to conduct constantly while the detector is in an inoperative position. Consequently, the solenoids will operate only once which is when switches 28, 28' are initially opened by the energized relays 27, 27' respectively causing the web to be crimped only one time during the entire shutdown period of the detector.

The photocell 14 is connected in series with resistor 48, 49 to form a voltage divider network and is connected in the circuit so that the grid potential of a triode 51 which is electrically connected across the resistor 49 of the network increases when the photocell 14 receives light from the light source through the apertures 2. The resistance of the photocell 14 decreases as it receives light whereupon the voltage across the resistor 49 increases. The triode 51 accordingly conducts whereupon the plate voltage is reduced and the reduced potential is fed through a resistor and capacitor, not numbered, to the intermediate grids of heptodes 24, 24' and also through the resistors 46, 47 to the control and suppressor grids of the heptodes 24, 24' thereby assuring that these tubes will not conduct while the light beam passes over the portion of the web 1 intermediate the adhesive stripes 3. Conversely, when the light source is prevented from striking the photocell 14 by the web rib 15, the resistance of the photocell 14 increases resulting in a decrease in the grid potential of the triode 51. The triode 51 accordingly conducts less or may not conduct at all resulting in an increased plate voltage which is supplied through the resistors 46, 47 to the control and suppressor grids of tubes 24, 24', and through the previously mentioned unnumbered resistor and capacitor to the intermediate grids of tubes 24, 24'. The increased potential of the control, suppressor, and intermediate grids assures conduction of the heptodes 24, 24' in the event that the light beam strikes a bare portion of the adhesive stripe 3 or a portion with insufficient adhesive within the desired tacking area. As indicated earlier, the lamps 6 and 12 are spaced apart a predetermined distance with respect to the dimensions of the film mount web 1 so that during the time that the web rib 15 intercepts the light beam and prevents it from impinging upon the photocell 14, the light beam of the light source 6 is scanning the central portion of the applied adhesive stripe 3.

During the operation of this invention, let us assume that the film mount web 1 is being transported through the adhesive stripe detector and that the detector is turned on and the light sources 6, 12 are operating. As the light source 6 scans the central portion of an adhesive stripe 3, the light source 12 is blocked by the web rib 15 preventing the light from impinging on the photocell 14. This results in an increased potential being impressed upon the intermediate grid of the heptode 24. If the adhesive stripe 3 is adequate, the reflected light striking the photocell 11 is a minimum and causes a low voltage impressed upon the grid of the heptode 24 in combination with the increased voltage impressed upon the intermediate grid is not sufficient to cause the heptode 24 to conduct. As the web 1 is transported further, the light source 6 scans the base portion of the web intermediate the adhesive stripes 3. The reflected light which in this position reaches a maximum value impinges upon the photocell 11 causing a positive potential to be impressed upon the grid of the heptode 24. This would normally cause the heptode 24 to conduct; however, during this period the light beam from the light source 12 passes through the aperture 2 and strikes the photocell 14 causing a reduced potential to be impressed upon the intermediate grid of the heptode 24. This reduced potential is sufficient to prevent the heptode 24 from conducting even though the grid potential is positive. Now let us assume that the light source is once again scanning the central portion of an adhesive stripe 3 and that it strikes a bare portion. The increased reflected light striking the photocell 11 causes a positive potential to be impressed upon the grid of the heptode 24. At the same time, the web rib 15 obstructs the light beam causing the photocell 14 and triode 51 to also impress an increased potential upon the intermediate grid of the heptode 24. The heptode 24 accordingly conducts, operating the relay 27 which opens the contact 28 making relay 29 inoperative. This causes the contact 33 to move to the position C placing the charged condenser 34 in series with the solenoid 5, the condenser 34 transferring its charge to the solenoid 5 which operates causing the solenoid armature 16 to strike the marking punch 17 imparting a permanent crimp 19 to the edge of the web 1 as the punch momentarily bottoms against the marking anvil 18. As soon as the light beam once again scans an adequate portion of the light-absorbing adhesive stripe 3, the reduced reflected light striking the photocell 11 decreases the potential impressed upon the grid of the heptode 24 causing it to stop conducting.

The invention has been described in detail with particular reference to preferred embodiments thereof, but it will be understood that variations and modifications can be effected within the spirit and scope of the invention as described hereinabove and as defined in the appended claims.

I claim:

1. In a device for detecting and indicating inadequate or faulty spaced apart adhesive stripes carried by a moving web of transparency mounts having alternately aligned perforations and ribs, and in which the adhesive stripes and the portion of the web in alignment therewith form a continuous scanning zone that reflects light varying in intensity depending upon the amount of adhesive carried by the zone, the combination comprising:

A—first means for directing a beam of light onto said scanning zone as the web is moved along;

B—a first light-sensitive cell for receiving the light of variable intensity reflected from said scanning zone;

C—second means positioned on one side of the web for directing a beam of light against the web along a line including said perforations and ribs as the web is moved along;

D—a second light-sensitive cell positioned on the opposite side of said web for receiving light from said second means passing through said perforations;

E—web deforming means comprising an anvil and a solenoid operating punch between which said web is interposed; and F—actuating means comprising a first relay controlled by said first light-sensitive cell, a first contact controlled by said first relay, a second relay controlled by said first contact, a normally charged first condenser, and a second contact controlled by said second relay for connecting said first condenser across said solenoid for energizing said solenoid, said actuating means further being simultaneously responsive
  (1) to the variations in intensity of the reflected light received by the first cell for actuating said deforming means whenever the light beam directed by said first beam strikes a portion of the scanning zone having insufficient adhesive and
  (2) to the light intermittently received by the second cell for preventing actuation of said deforming means while said light beam from said first means is scanning the portion of the scanning zone between successive adhesive stripes.

2. In a device for detecting and indicating inadequate or faulty spaced apart adhesive stripes carried by a moving web of transparency mounts having alternately aligned perforations and ribs, and in which the adhesive stripes and the portion of the web in alignment therewith form a continuous scanning zone that reflects light varying in intensity depending upon the amount of adhesive carried by the zone, the combination comprising:

A—first means for directing a beam of light onto said scanning zone as the web is moved along;

B—a first light-sensitive cell for receiving the light of variable intensity reflected from said scanning zone;

C—second means positioned on one side of the web for directing a beam of light against the web along a line including said perforations and ribs as the web is moved along;

D—a second light-sensitive cell positioned on the opposite side of said web for receiving light from said second means passing through said perforations;

E—web deforming means comprising an anvil and a solenoid operating punch between which said web is interposed; and F—means for selectively actuating said deforming means comprising a first vacuum tube having its control grid connected to said first light-sensitive cell, a second vacuum tube having its control grid connected to said second light-sensitive cell, and the plate of said second vacuum tube connected to the intermediate grid of said first vacuum tube, said actuating means further being simultaneously responsive
  (1) to the variations in intensity of the reflected light received by the first cell for actuating said deforming means whenever the light beam directed by said first beam strikes a portion of the scanning zone having insufficient adhesive and
  (2) to the light intermittently received by the second cell for preventing actuation of said deforming means while said light beam from said first means is scanning the portion of the scanning zone between successive adhesive stripes.

3. In a device for detecting and indicating inadequate or faulty spaced apart adhesive stripes carried by a moving web of transparency mounts having alternately aligned perforations and ribs, and in which the adhesive stripes and a portion of the web in alignment therewith form a continuous scanning zone that reflects light varying in intensity depending upon the amount of adhesive carried by the zone, the combination comprising:

A—first means for directing a beam of light onto said scanning zone as the web is moved along;

B—a first light-sensitive cell for receiving the reflected light of variable intensity from said scanning zone;

C—second means positioned on one side of the web for directing a beam of light against the web along the line including said perforations and ribs as the web is moved along;

D—a second light-sensitive cell positioned on the opposite side of said web for receiving light from said second means passing through said perforations;

E—solenoid-operated web deforming means; and

F—means for selectively actuating the solenoid of said web deforming means comprising a vacuum tube controlled by said first and second light-sensitive cells, a first relay connected to the plate of said vacuum tube and controlled thereby, a first contact controlled by said first relay, a second relay controlled by said first contact, a normally charged condenser, and a second contact controlled by said second relay for connecting said condenser across the solenoid for energizing said solenoid, and being simultaneously responsive (1) to the variations in intensity of the reflective light received by the first cell for actuating said deforming means whenever the light beam directed by said first beams strikes a portion of the scanning zone having insufficient adhesive, and (2) to the light intermittently received by the second cell for preventing actuation of said deforming means while said light beam from said first means is scanning the portion of the scanning zone between successive adhesive strips.

4. In a device for detecting and indicating an inadequate or faulty adhesive stripe carried by a moving web of transparency mounts in which the adhesive stripe and the portion of the web in alignment therewith form a scanning zone that reflects light varying in intensity depending on the amount of adhesive carried by the zone, the combination comprising: means for directing a beam of light onto said scanning zone as the web is moved along; a light-sensitive cell for receiving the reflected light of variable intensity from said scanning zone; solenoid-operated web-deforming means; actuating means connected to said light-sensitive cell and responsive to the variations in intensity of the reflected light received by the cell for actuating said deforming means whenever the light beam strikes a portion of the scanning zone having insufficient adhesive, said actuating means comprising a first relay controlled by said light-sensitive cell, a first contact controlled by said first relay, a second relay controlled by said first contact, a normally charged first condenser, and a second contact controlled by said second relay for connecting said first condenser across said solenoid for energizing said solenoid; and a delay circuit for said second relay comprising a second condenser having one side connected to one end of said second relay, a resistor having one end connected to said one side of said second condenser, a switch controlled by said second relay and having one end connected to the other side of said second condenser, and the other end of said switch electrically movable between a first position connecting said other side of said second condenser to the other end of said resistor for discharging said second condenser, and a second position connecting said other side of said second condenser to the other end of said second relay whereby said second relay will not operate upon closing of the first contact until said second condenser is charged up to a predetermined value, thereby providing a time delay sufficient to permit said first condenser to energize said solenoid.

5. The invention according to claim 2 wherein said actuating means further comprises a first relay connected to the plate of said first vacuum tube and controlled thereby, a first contact controlled by said first relay, a second relay controlled by said first contact, a normally charged condenser, and a second contact controlled by said second relay for connecting said condenser across said solenoid for energizing said solenoid.

6. The invention according to claim 2 wherein a resistor has one end connected to the plate of said second vacuum tube, and the other end connected to the control and suppressor grids of said first vacuum tube causing said first vacuum tube to conduct constantly due to drift voltage when the detecting device is in an inoperative position.

7. The invention according to claim 3 wherein said first light-sensitive cell is connected to the control grid of said vacuum tube, and said second light-sensitive cell is connected to the intermediate grid of said vacuum tube to prevent operation of the vacuum tube while the light beam from said first means is scanning the portion of the scanning zone between successive adhesive stripes.

References Cited in the file of this patent

UNITED STATES PATENTS

| | | |
|---|---|---|
| 1,678,884 | Sweet | July 31, 1928 |
| 2,047,221 | Pechy | July 14, 1936 |
| 2,049,376 | Hertwig et al. | July 28, 1936 |
| 2,246,906 | Viebahn et al. | June 24, 1941 |
| 2,280,948 | Gulliksen | Apr. 28, 1942 |
| 2,429,331 | Sachtleben | Oct. 21, 1947 |
| 2,563,213 | Coleman | Aug. 7, 1951 |
| 2,588,789 | Zinn | Mar. 11, 1952 |
| 2,615,333 | Gardinor et al. | Oct. 28, 1952 |
| 2,719,235 | Emerson | Sept. 27, 1955 |
| 2,922,929 | Cooper et al. | Jan. 26, 1960 |

FOREIGN PATENTS

| | | |
|---|---|---|
| 10,677 | Australia | Dec. 29, 1933 |